A. J. NADREAU.
BICYCLE.
APPLICATION FILED NOV. 7, 1914.
1,143,850.
Patented June 22, 1915.
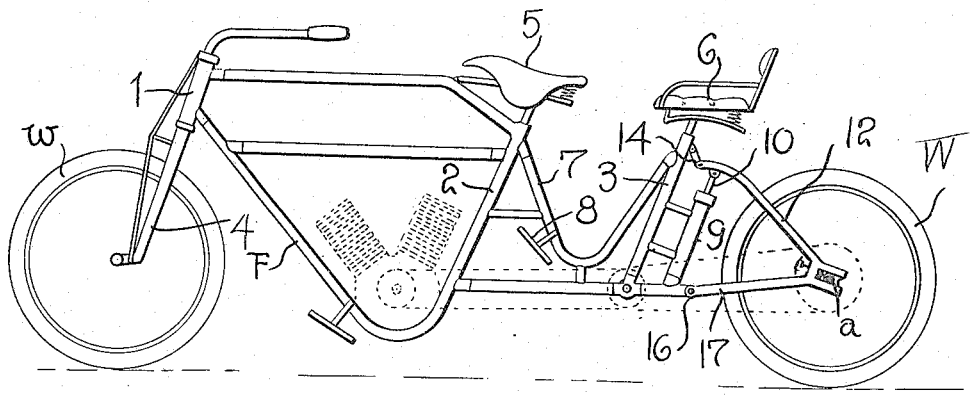
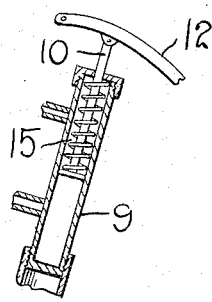
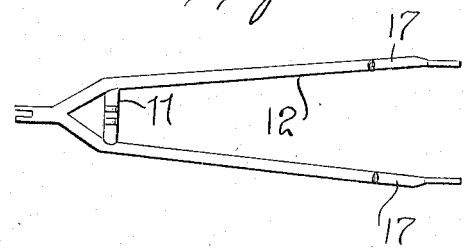
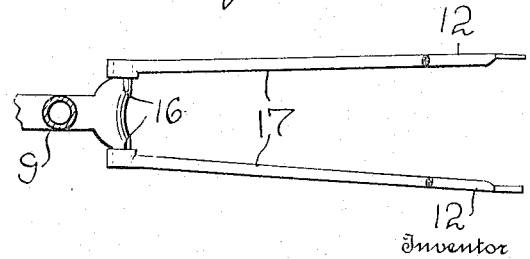
Witnesses
Robert M. Sutphen
A. I. Hind
Inventor
A. J. NADREAU
By Watson E. Coleman
Attorney

UNITED STATES PATENT OFFICE.

ALPHONSE J. NADREAU, OF MIAMI, FLORIDA.

BICYCLE.

1,143,850.

Specification of Letters Patent.

Patented June 22, 1915.

Application filed November 7, 1914. Serial No. 870,869.

*To all whom it may concern:*

Be it known that I, ALPHONSE J. NADREAU, a citizen of the United States, residing at Miami, in the county of Dade and State of Florida, have invented certain new and useful Improvements in Bicycles, of which the following is a specification, reference being had to the accompanying drawings.

This invention relates to certain improvements in bicycles and has relation more particularly to a device of this general character adapted to be motor driven; and an object of the invention is to provide a bicycle of this general character having novel and improved means whereby a plurality of passengers may be carried with convenience and facility.

Furthermore, it is an object of the invention to provide a novel and improved device of this general character whereby the shocks or jars incident to travel are substantially entirely absorbed or eliminated.

The invention consists in the details of construction and in the combination and arrangement of the several parts of my improved bicycle whereby certain important advantages are attained and the device is rendered simpler, less expensive and otherwise more convenient and advantageous for use, all as will be hereinafter more fully set forth.

The novel features of the invention will be carefully defined in the appended claims.

In order that my invention may be the better understood, I will now proceed to describe the same with reference to the accompanying drawings, wherein—

Figure 1 is an elevational view of a bicycle constructed in accordance with an embodiment of my invention, the driving means therefor being indicated by dotted lines; Fig. 2 is an enlarged detail sectional view taken through the tubular spring post herein included, the part coacting therewith being in elevation; Fig. 3 is a view in bottom plan of the fork coacting with the tubular spring post; and Fig. 4 is a fragmentary view, partly in section and partly in top plan, illustrating additional details of the invention.

As disclosed in the accompanying drawings, F denotes a frame of conventional construction including the head 1 and the seat posts 2 and 3 disposed in alinement and in predetermined spaced relation. The head 3 has operatively engaged therewith the steering fork 4 in which is mounted the forward wheel $w$, while the post 2 is adapted to have operatively engaged therewith a seat 5, as generally employed in connection with cycles. The post 3 is adapted to have operatively engaged therewith a passenger seat 6 of any preferred construction but preferably in the nature of an upholstered chair whereby the occupant may be accommodated with comfort. A substantially V-shape brace 7 interposed between the posts 2 and 3 is provided with the laterally disposed foot rests 8 for the convenience of the occupant of the seat 6.

Disposed rearwardly of the post 3 is the suitably supported tubular spring post 9 with which is telescopingly engaged the rod 10, the upper extremity of said rod being pivotally engaged with the cross member 11 of a fork 12, the outer or lower extremities of said fork being operatively engaged with the axle $a$ of the rear wheel W, while the upper or forward extremity thereof is pivotally engaged, as at 14, with the upper end portion of the seat post 3.

Positioned within the post 9 is a coil spring 15 surrounding the rod 10 and having its lower end secured to the lower extremity of the post while the upper extremity of the spring 15 is suitably secured to the upper end portion of the post 9. By this arrangement, it will be readily perceived that the spring 15 serves to absorb all shock or jar incident to the travel of the device.

The frame F adjacent the lower extremity of the post 9 is provided with the oppositely disposed laterally directed trunnions 16, with each of which is pivotally engaged an arm 17 the forward or outer extremity whereof being also operatively engaged with a lower extremity of the fork 12. As the particular means for driving the rear wheel forms no part of my present invention, the same is disclosed in the accompanying drawings in a conventional manner.

From the foregoing description, it is thought to be obvious that a bicycle constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice.

I claim:

1. A device of the character described comprising a frame including a seat post, a tubular post positioned rearwardly of the seat post, a fork pivotally engaged with the seat post and overlying the tubular post and adapted for engagement with the axle of the rear wheel, the pivotal connection between the fork and post permitting endwise movement of the fork, a rod pivotally engaged with the fork and disposed within the tubular post, a coil spring positioned within the tubular member and having its upper extremity secured to the upper end portion of the tubular post, said rod being disposed through the coil spring and having its lower extremity suitably secured to the lower extremity of the coil spring and an arm carried by the fork pivotally engaged with the frame.

2. A device of the character described comprising a frame including a seat post, a tubular post positioned rearwardly of the seat post, a fork pivotally engaged with the seat post and overlying the tubular post and adapted for engagement with the axle of the rear wheel, the pivotal connection between the fork and post permitting endwise movement of the fork, a rod pivotally engaged with the fork and disposed within the tubular post, a coil spring positioned within the tubular member and having its upper extremity secured to the upper end portion of the tubular post, said rod being disposed through the coil spring and having its lower extremity suitably secured to the lower extremity of the coil spring, laterally directed oppositely disposed trunnions carried by the frame adjacent the lower extremity of the tubular post and rearwardly thereof, and an arm pivotally engaged with each of the trunnions and adapted to be connected with the fork.

3. In a device of the character described, a frame including a seat post, a tubular post positioned rearwardly of the seat post, a fork pivotally engaged with the seat post and overlying the tubular post and adapted for engagement with the axle of the rear wheel, the pivotal connection between the fork and post permitting endwise movement of the fork, a rod pivotally engaged with the fork and disposed within the tubular post, a spring member disposed within the tubular member and coacting with the rod, and an arm carried by the fork pivotally engaged with the frame.

4. In a device of the character described, a frame including a seat post, a tubular post positioned rearwardly of the seat post, a fork overlying the tubular post and adapted for engagement with the axle of the rear wheel, a link interposed between the seat post and the adjacent extremity of the fork, a rod pivotally engaged with the fork and disposed within the tubular post, a spring member disposed within the tubular member and coacting with the rod, and an arm carried by the fork pivotally engaged with the frame.

In testimony whereof I hereunto affix my signature in the presence of two witnesses.

ALPHONSE J. NADREAU.

Witnesses:
M. L. MOIR,
M. A. TRENHAM.

Copies of this patent may be obtained for five cents each, by addressing the "Commissioner of Patents, Washington, D. C."